United States Patent [19]

Sone et al.

[11] 4,227,446

[45] Oct. 14, 1980

[54] ELECTRONIC AIR CLEANER FOR PASSENGER COMPARTMENT OF VEHICLE

[75] Inventors: Masazumi Sone, Yokohama; Kazuhiko Suzuki, Yokosuka; Yukitsugu Fukumori, Yokohama, all of Japan

[73] Assignee: Nissan Motor Company, Limited, Yokohama, Japan

[21] Appl. No.: 28,867

[22] Filed: Apr. 10, 1979

[30] Foreign Application Priority Data

May 30, 1978 [JP] Japan .................................. 53/72352

[51] Int. Cl.³ .................. B60H 3/06; B03C 3/01; B03C 3/32
[52] U.S. Cl. .................... 98/2.11; 55/102; 55/126; 55/276; 55/279; 55/385 B; 422/121
[58] Field of Search ............... 55/102, 124, 126, 130, 55/133, 137, 134, 145, 146, 276, 279, 385 A, 385 B; 98/2.11; 250/455, 504, 515; 422/121, 240, 241

[56] References Cited

U.S. PATENT DOCUMENTS

| 3,744,216 | 7/1973 | Halloran | 55/102 |
| 3,827,862 | 8/1974 | Berlant | 55/279 |
| 3,844,741 | 10/1974 | Dimitrik | 55/126 |
| 3,846,072 | 11/1974 | Patterson | 55/102 |
| 4,102,654 | 7/1978 | Pellin | 55/279 |
| 4,133,652 | 1/1979 | Ishikawa et al. | 55/279 |

*Primary Examiner*—David L. Lacey
*Attorney, Agent, or Firm*—Lowe, King, Price & Becker

[57] ABSTRACT

An electronic air cleaner having therein an electrostatic precipitator, an ultraviolet lamp, a deodorizing filter and at least one lead wire which extends along the deodorizing filter from an electric power source to a socket of the ultraviolet lamp. A channel-shaped holder receives in the channel thereof a lower section of a frame of the deodorizing filter so as to form in the channel an enclosed space through which the lead wire passes. At least the wall portions bounding the enclosed space are constructed of electrically conductive material and are grounded so that any noise wave emitted from the lead wire positioned within the enclosed space is prevented from leaking out by the shielding function of the conductive wall portions.

6 Claims, 6 Drawing Figures

ELECTRONIC AIR CLEANER FOR PASSENGER COMPARTMENT OF VEHICLE

FIELD OF THE INVENTION

The present invention relates in general to an air cleaner and more particularly to an electronic air cleaner mounted in a passenger compartment of a motor vehicle for cleaning air in the compartment. More specifically, the present invention is concerned with an electronic air cleaner which is constructed to suppress the radio-interference caused by it.

BACKGROUND OF THE INVENTION

For cleaning or purifying the air in the passenger compartment of a vehicle, many kinds of electronic air cleaners having therein a so-called electrostatic precipitator have been used. Some of these cleaners are equipped with air sterilizing means (such as an ultraviolet sterilizing lamp), air deodorizing means (such as an activated carbon filter) and negative ion generating means for providing the passengers with comfortable ride. However, in such electronic cleaners, a considerable amount of electric noise waves tend to leak out from the cleaner especially from the ultraviolet lamp and its neighborhood. Such noise waves interfere with other sensitive electric devices of the vehicle, such as a radio, to a great degree. Especially, as viewed in FIG. 1, if such electronic air cleaner "A" with an ultraviolet lamp is set at a position close to an antenna "B" of the radio, the interference by the noise waves becomes very critical. In fact, for achieving smooth air flow in the passenger compartment of the vehicle, the cleaner "A" is used to be set on a rear parcel shelf "C" even if the antenna "B" of the radio is attached to or embedded in a rear window pane "D" which is usually located above the rear parcel shelf "C", as shown.

OBJECTS OF THE INVENTION

It is therefore an object of the present invention to provide an improved electronic air cleaner which is constructed and designed to suppress leakage of electric noise waves therefrom.

It is another object of the present invention to provide an electronic air cleaner which has a noise wave shielding construction for shielding lead wires leading to a socket of an ultraviolet lamp from an electric power source.

It is still another object of the present invention to provide an electronic air cleaner in which a shielding construction for lead wires of an ultraviolet lamp is provided by an activated carbon deodorizing filter and a holder of the filter.

It is a further object of the invention to provide an electronic air cleaner in which a noise wave shielding construction is provided by electrically conductive wall portions which are arranged to enclose lead wires of an ultraviolet lamp.

According to the present invention, there is provided an electronic air cleaner having therein an electrostatic precipitator for removing dust particles suspended in air, an ultraviolet lamp for sterilizing air, a deodorizing filter for eliminating snell in air a holder supporting the deorizing filter and at least one lead wire extending along the deodorizing filter from an electric power source to the ultraviolet lamp, wherein the deodorizing filter has a frame and the holder has a channel in which a part of the frame is snugly received so as to form in the channel an enclosed space bounded by wall portions, the enclosed space receiving therein the lead wire, the wall portions being constructed of electrically conductive material and being grounded.

SUMMARY OF THE DRAWINGS

Other objects and advantages of the present invention will become clear from the following description when taken in conjunction with the accompanying drawings, in which.

DESCRIPTION OF THE PRIOR ART

Figure 1:
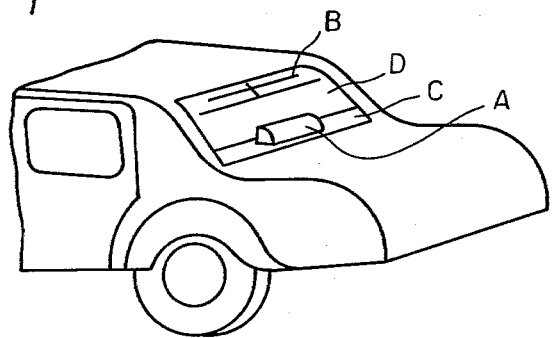
FIG. 1 is a partial sketch of a passenger motor vehicle having an electronic air cleaner set on a rear parcel shelf near a rear window pane to or in which an antenna of a radio is attached or embedded.
Figure 2:
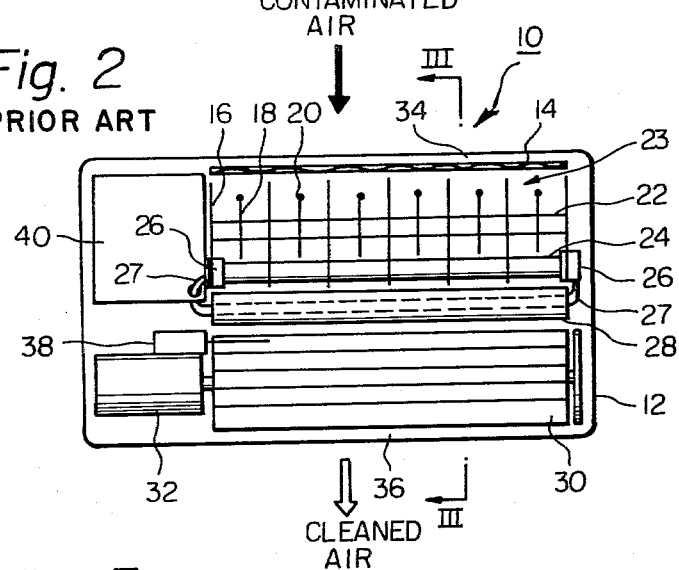
FIG. 2 is a plan view of a conventionally used electronic air cleaner with an upper lid being removed.
Figure 3:
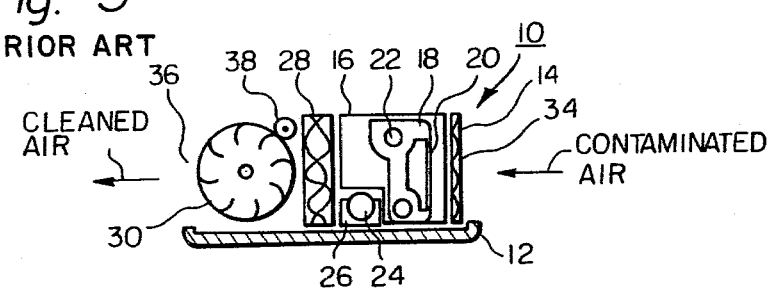
FIG. 3 is a sectional view taken along the line III—III of FIG. 2.

Referring to FIGS. 2 and 3, there is illustrated a conventionally used electronic air cleaner 10 which is adapted to be set in a passenger compartment of a vehicle.

In these figures, numeral 12 denotes a base member on which a cover or lid (not shown) is to be set. Standing on one side of the base member 12 is a prefilter 14 of metal wire netting. The filter 14 is held at the grounded potential and removes coarse dust particles suspended in air flowing into the cleaner 10. Positioned inside the filter 14 are grounded parallelly and equally spaced electrodes 16 (only one is numbered) each consisting of a conductive plate extending inwardly at right angles with respect to the filter 14, as is understood from FIG. 2. A plurality of support plates 18 (only one is numbered) are juxtaposed within the grounded electrodes 16 such that each support plate 18 is spacedly disposed between adjacent two of the grounded electrodes 16. The support plates 18 are also constructed of a conductive material. Supported by and connected to the support plates 18 are high voltage electrodes 20 (only one is numbered) which extend generally perpendicularly to the base member 12, as is seen from FIG. 3. Designated by numeral 22 is an insulating rod by which the grounded electrodes 16 and the support plates 18 are supported so as to be electrically insulated from each other. Although not shown in the drawings, the grounded electrodes 16 are electrically connected to each other and to the body of the vehicle. The high voltage electrodes 20 are electrically connected to each other. With this, a so-called electrostatic precipitator 23 (see FIG. 2) is formed.

Positioned inside the support plate 18 near the base member 12 is an ultraviolet sterilizing lamp 24 which is supported by sockets 26. Lead wires 27 leading from a later-mentioned electric converter 40 are connected to the sockets 26 for feeding the lamp 24 with adequate electric power. An activated carbon deodorizing filter 28 is placed at the rear of the ultraviolet lamp 24. A cross-flow fan 30 driven by an electric motor 32 is provided to take in the polluted air from an air inlet 34 and let out the cleaned or treated air to an air outlet 36. A negative ion generator 38 is positioned upstream of the fan 30. Designated by numeral 40 is an electric converter which supplies the electric devices such as the electrostatic precipitator 23, the ultraviolet lamp 24, the electric motor 32 and the negative ion generator 38, with necessary electric power. For instance, the electric converter 40 is designed to supply A.C. 500 V to the ultraviolet lamp 24, D.C. +5 kV to the electrostatic precipitator 23 and D.C. −5 kV to the negative ion generator 38 by converting the direct current supplied by a D.C. 12 V battery (not shown).

In operation, the contaminated or polluted air in the passenger compartment is forced to flow, by the fan 30, into the inlet opening 34 and then pass through the filter 14 to remove coarse dust particles. The air thus losing the coarse dust particles is then led to the electrostatic precipitator 23 where the remaining fine dust particles are charged on the principle of electrostatic dust collection and attracted to the grounded electrodes 16 to be arrested thereon. The air thus losing the coarse and fine dust particles passes by the ultraviolet lamp 24 for sterilization of the same and then the air is led to the activated carbon deodorizing filter 28 for elimination of smell of air. The deodorized air is then led to the negative ion generator 38 to be fed with the negative ion. The air thus cleaned or treated is then discharged from the outlet 36 of the cleaner 10 into the passenger compartment.

In the above-mentioned cleaner 10, however, unwanted electric noise waves tend to leak out considerably from the cleaner 10, especially from the ultraviolet lamp 24 and its neighborhood. In fact, the lead wires 27 leading from the electric power source 40 to the socket 26 far from the source 40 act as an antenna for emission of the noise waves to space.

DESCRIPTION OF THE PREFERRED EMBODIMENT

Figure 4A:
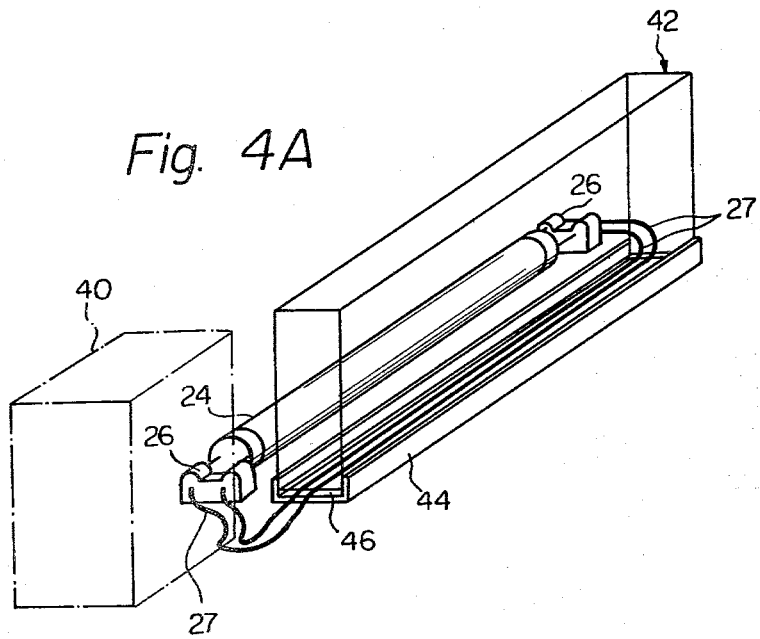
FIG. 4A is a view of a part of the electronic air cleaner according to the present invention, showing an activated carbon deodorizing filter supported by a holder arranged beside an ultraviolet sterilizing lamp, the filter and the holder being constructed to shield lead wires leading to a socket of the lamp.
Figure 4B:
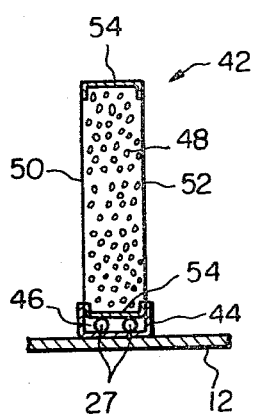
FIG. 4B is a sectional view of the assembly of the activated carbon deodorizing filter and the holder of FIG. 4A.
Figure 4C:
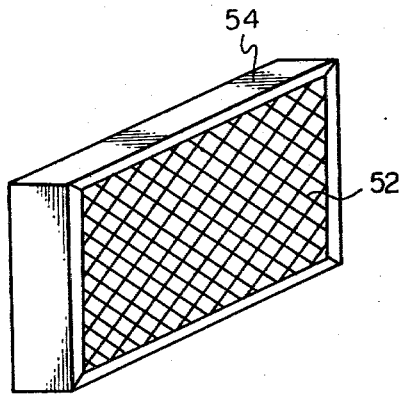
FIG. 4C is a perspective view of the activated carbon deodorizing filter.

Referring to FIGS. 4A to 4C, especially FIG. 4A, there is illustrated an essential part of the electronic air cleaner of the invention, which part is incorporated with an activated carbon filter 42. The electronic air cleaner of the invention is substantially the same in construction and configuration as the above-mentioned conventional cleaner 10 except the essential part. Thus, the whole view of the cleaner of the subject invention is not presented for simplicity of the drawing and parts substantially the same as in the conventional cleaner 10 will be identified by the same reference numerals.

As is shown in FIGS. 4A and 4B, the activated carbon filter 42 is snugly received in the channel of a channel-shaped holder 44 which is secured to the base member 12 by means of bonding or bolt fastening. The filter 42 shown comprises a mass of activated carbon 48, front and rear metal wire nettings 50 and 52 sandwiching therebetween the carbon mass 48 and a frame 54 enclosing the mass. The lead wires 27 leading to the socket 26 far from the electric power source 40 are disposed in an enclosed space 46 defined between the lower section of the frame 54 and the channel-shaped holder 44. Both the holder 44 and the frame 54 are constructed of conductive material such as Aluminum plate or steel plate and are held at the grounded potential. Thus, it will be appreciated that the noise waves emitted from the lead wires 27 are prevented from radiating outwardly by the shielding construction consisting of the lower section of the frame 54 and the channel-shaped holder 44.

Although in the above-mentioned cleaner of the invention, the shielding construction for the lead wires 27 is provided by the wholly conductive frame 54 and the wholly conductive holder 44, it can be also provided by using conductive material at only the wall portions by which the enclosed space 46 is defined. A plastic frame with the lower section thereof lined with a thin metal plate and a plastic holder with the upper surface thereof lined with a thin metal plate are thus also usable in the invention. The lining of the metal plate to the plastic bodies may be made by vacuum evaporation technique.

What is claimed is:

1. An electronic air cleaner comprising an electrostatic precipitator for removing dust particles suspended in air, an ultraviolet lamp for sterilizing air, a deodorizing filter for eliminating smell in air, a holder supporting said deodorizing filter and at least one lead wire extending along said deodorizing filter from an electric power source to said ultraviolet lamp, said lead wire having a tendency to radiate electrical noise, wherein said deodorizing filter has a frame and said holder has wall portions defining a channel, a part of said frame being snugly seated in said channel to form an enclosed space bounded by said wall portions, said enclosed space receiving therein said lead wire, said wall portions being constructed of electrically grounded conductive material to conduct to ground electrical noise.

2. An electronic air cleaner as claimed in claim 1, in which said frame and said holder are constructed of metal.

3. An electronic air cleaner as claimed in claim 1, in which said frame and said holder are constructed of electrically insulating material, sections of said frame and said holder which constitute said wall portions being lined with metal plates.

4. An electronic air cleaner as claimed in claim 3, in which said metal plates deposited to said sections are vacuum evaporated metal films.

5. In a vehicle having an electric device sensitive to electric noise and having an electric air cleaner for cleaning air in a passenger compartment, said cleaner being positioned close to the electrically sensitive device and comprising an electrostatic precipitator for removing fine dust particles suspended in the air, said precipitator including electrically insulated first and second groups of electrodes between which a high electric potential is applied; an ultraviolet lamp for sterilizing the air; a deodorizing filter for eliminating smell in air; a holder by which said deodorizing filter is supported; and at least one lead wire which extends along said deodorizing filter from an electric power source to said ultraviolet lamp for providing said lamp with electric power, said lead wire having a tendency to radiate electrical noise;

an improvement for reducing the effect of electrical noise generated by said lead wire, wherein said deodorizing filter has a frame and said holder has wall portions defining a channel, a part of said frame being snugly seated in said channel to form an enclosed space bounded by said wall portions, said enclosed space receiving therein said lead wire, and said wall portions being constructed of an electrically conductive material to conduct to ground electrical noise generated by said lead wire.

6. The apparatus of claim 1 or claim 5 wherein said frame part of said deodorizing filter is formed of an electrically conducting material and is in electrical contact with said wall portions of said holder.

* * * * *